United States Patent
Kim et al.

(10) Patent No.: US 9,629,036 B2
(45) Date of Patent: *Apr. 18, 2017

(54) METHOD AND APPARATUS FOR PERFORMING HANDOVER USING PACKET DATA CONVERGENCE PROTOCOL (PDCP) REORDERING IN MOBILE COMMUNICATION SYSTEM

(71) Applicant: Samsung Electronics Co., Ltd., Gyeonggi-do (KR)

(72) Inventors: Soeng-Hun Kim, Gyeonggi-do (KR); Kyeong-In Jeong, Gyeonggi-do (KR); Gert Jan Van Lieshout, Middlesex (GB); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,235

(22) Filed: Nov. 19, 2013

(65) Prior Publication Data

US 2014/0071948 A1    Mar. 13, 2014

Related U.S. Application Data

(63) Continuation of application No. 11/875,315, filed on Oct. 19, 2007, now Pat. No. 8,588,175.

(30) Foreign Application Priority Data

Oct. 19, 2006  (KR) .................. 10-2006-0101842

(51) Int. Cl.
*H04W 36/24*    (2009.01)
*H04W 36/00*    (2009.01)
(Continued)

(52) U.S. Cl.
CPC ....... *H04W 36/0055* (2013.01); *H04L 1/1841* (2013.01); *H04W 36/02* (2013.01); *H04W 36/24* (2013.01)

(58) Field of Classification Search
CPC ...................................................... H04W 36/24
(Continued)

(56) References Cited

U.S. PATENT DOCUMENTS 5,940,371 A   8/1999  Mitts et al.
6,691,273 B2  2/2004  Wager et al.
(Continued)

FOREIGN PATENT DOCUMENTS

CN    1514607    7/2004
EP    0 777 396  6/1997
(Continued)

OTHER PUBLICATIONS

NTT DoCoMo Inc.: "UE PDCP Reordering at Inter eNB Handover", 3GPP TSG RAN WG2, Meeting #54, Aug. 28, 2006.
(Continued)

*Primary Examiner* — Rasheed Gidado
(74) *Attorney, Agent, or Firm* — The Farrell Law Firm, P.C.

(57) ABSTRACT

Improving communication efficiency in handover re-establishing an ARQ entity in a mobile communication system is disclosed. The method includes transmitting first Packet Data Convergence Protocol (PDCP) Packet Data Units (PDUs) correctly received from the source cell, together with a special indication requiring reordering of the first PDCP PDUs, from a Radio Link Control (RLC) receiving buffer to a PDCP receiving entity when a handover command message from a source cell to a target cell is received; buffering the first PDCP PDUs in a PDCP PDU reordering buffer by the PDCP receiving entity in response to the
(Continued)

special indication; and when a second PDCP PDU is received from the target cell through a new RLC receiving entity for the target cell, outputting third PDCP PDUs up to a PDCP PDU before a first missing PDCP PDU having a sequence number higher than that of the second PDCP PDU from the PDCP reordering buffer. In the method, a PDCP entity performs reordering, thereby improving efficiency of communication.

16 Claims, 12 Drawing Sheets

(51) Int. Cl.
*H04L 1/18* (2006.01)
*H04W 36/02* (2009.01)

(58) Field of Classification Search
USPC .......................................................... 370/331
See application file for complete search history.

(56) References Cited

U.S. PATENT DOCUMENTS

| | | | |
|---|---|---|---|
| 6,725,040 B2 | 4/2004 | Jiang | |
| 6,891,799 B1 | 5/2005 | Hagal et al. | |
| 6,930,980 B2* | 8/2005 | Tourunen | H04L 12/08 370/236 |
| 6,993,332 B2 | 1/2006 | Pedersen et al. | |
| 7,046,648 B2 | 5/2006 | Zhang et al. | |
| 7,356,146 B2* | 4/2008 | Yi | H04L 63/0457 380/262 |
| 7,359,345 B2 | 4/2008 | Chang et al. | |
| 7,376,103 B2 | 5/2008 | Lee | |
| 7,466,708 B2 | 12/2008 | Hans et al. | |
| 8,098,771 B2 | 1/2012 | Herrmann | |
| 8,144,663 B2 | 3/2012 | Petrovic et al. | |
| 8,254,935 B2 | 8/2012 | Tomita et al. | |
| 8,401,037 B2* | 3/2013 | Kim et al. | 370/473 |
| 2001/0017850 A1* | 8/2001 | Kalliokulju | H04L 69/324 370/331 |
| 2001/0043579 A1 | 11/2001 | Tourunen et al. | |
| 2002/0067706 A1 | 6/2002 | Bautz et al. | |
| 2002/0094814 A1 | 7/2002 | Wigell et al. | |
| 2002/0095635 A1 | 7/2002 | Wager et al. | |
| 2003/0007490 A1* | 1/2003 | Yi | H04L 1/18 370/394 |
| 2003/0053431 A1 | 3/2003 | Madour | |
| 2003/0137931 A1 | 7/2003 | Hans et al. | |
| 2003/0165161 A1 | 9/2003 | Kalliokulju et al. | |
| 2003/0210714 A1 | 11/2003 | Wu | |
| 2003/0224786 A1 | 12/2003 | Lee et al. | |
| 2004/0042491 A1* | 3/2004 | Sarkkinen | H04L 1/1642 370/469 |
| 2004/0052229 A1 | 3/2004 | Terry et al. | |
| 2004/0052234 A1 | 3/2004 | Ameigeiras et al. | |
| 2004/0120317 A1 | 6/2004 | Forssell | |
| 2004/0151154 A1* | 8/2004 | Wu | H04L 1/1874 370/349 |
| 2004/0248575 A1* | 12/2004 | Rajala et al. | 455/436 |
| 2005/0007994 A1 | 1/2005 | Fukuzawa et al. | |
| 2005/0213540 A1* | 9/2005 | Matsumoto | H04L 1/1809 370/331 |
| 2005/0270996 A1 | 12/2005 | Yi et al. | |
| 2006/0072504 A1 | 4/2006 | Hu | |
| 2007/0008990 A1 | 1/2007 | Torsner | |
| 2007/0047493 A1* | 3/2007 | Park | H04W 74/006 370/331 |
| 2007/0081492 A1 | 4/2007 | Petrovic et al. | |
| 2007/0110101 A1* | 5/2007 | Wu | H04L 1/1874 370/469 |
| 2007/0115881 A1 | 5/2007 | Ohkubo et al. | |
| 2007/0213058 A1* | 9/2007 | Shaheen | H04W 92/14 455/436 |
| 2007/0258591 A1 | 11/2007 | Terry et al. | |
| 2007/0291695 A1* | 12/2007 | Sammour | H04W 36/02 370/331 |
| 2008/0019320 A1 | 1/2008 | Phan et al. | |
| 2008/0069142 A1 | 3/2008 | Wu | |
| 2008/0095116 A1 | 4/2008 | Kim et al. | |
| 2008/0188224 A1* | 8/2008 | Pani et al. | 455/436 |
| 2008/0273482 A1 | 11/2008 | Lee et al. | |
| 2009/0034507 A1* | 2/2009 | Chang et al. | 370/349 |
| 2009/0185535 A1* | 7/2009 | Lee et al. | 370/331 |

FOREIGN PATENT DOCUMENTS

| | | | |
|---|---|---|---|
| EP | 1 276 279 | 1/2003 | |
| EP | 1 276 293 | 1/2003 | |
| EP | 1 343 267 | 9/2003 | |
| JP | 09-186704 | 7/1997 | |
| JP | 2000-228676 | 8/2000 | |
| JP | 2001-024707 | 1/2001 | |
| JP | 2001-506951 | 5/2001 | |
| JP | 2001-509652 | 7/2001 | |
| JP | 2005-012718 | 1/2005 | |
| JP | 2005-513907 | 5/2005 | |
| JP | 2005-287074 | 10/2005 | |
| JP | 2005-539468 | 12/2005 | |
| JP | 2006-523042 | 10/2006 | |
| JP | 2007-506378 | 3/2007 | |
| JP | 2010-507317 | 3/2010 | |
| KR | 1020060051924 | 5/2006 | |
| KR | 1020070107560 | 11/2007 | |
| KR | WO 2007126192 A1 * | 11/2007 | H04W 36/02 |
| RU | 2 232 477 | 7/2004 | |
| WO | WO 2004/030396 | 4/2004 | |
| WO | WO 2005/018241 | 2/2005 | |
| WO | WO 2005/022812 | 3/2005 | |
| WO | WO 2005/029785 | 3/2005 | |
| WO | WO 2007/148634 | 12/2007 | |

OTHER PUBLICATIONS

Motorola: "Reordering of Downlink RLC SLDUs during Handovers", 3GPP TSG-RAN-WG2, Meeting #55, Oct. 9, 2006.
LG Electronics: Consideration on Packet Reordering, 3GPP TSG-RAN Working Group 2 #54, Aug. 28, 2006.
LG Eletronics: "Issue on Packet Reordering", R2-062968, TSG-RAN Working Group 2 #55, Oct. 5, 2006.
NEC: "Lower PDCP Layer for Mobility", TSG-RAN Working Group, XP007904153, May 19, 2006.
NEC, "Lower PDCP Layer for Mobility", R2-061344, TSG-RAN Working Group 2 #53, May 8, 2006.
LG Eletronics: "In-Sequence Delivery Support for Handover", R2-061363, TSG-RAN Working Group 2 #53, May 8, 2006.
NTT DoCoMo, Inc., "In-Sequence Data Delivery for SAE Bearer Service", R2-061265, 3GPP TSG-RAN2 #53, May 12, 2006.
NEC, "Reordering of Downlink RLC SDUs During Handovers", R2-052283, TSG-RAN Working Group 2 #54, Aug. 23, 2006.
Ericsson, "Intra-LTE Mobility Procedure", R3-061489, 3GPP TSG-RAN WG3 #53bis, Oct. 10-13, 2006.
NEC, "Lossless/Seamless Intra-LTE Handover", R3-061535, 3GPP TSG RAN3#53bis, Oct. 10-13, 2006.
3rd Generation Partnership Project; Technical Specification Group Radio Access Network; Evolved Universal Terrestrial Radio Access (E-UTRA) and Evolved Universal Terrestrial Radio Access Network (E-UTRAN); Radio Interface Protocol Aspects (Release 7), 3GPP TR 25.813 V7.0.0, Jun. 2006.
Samsung, "Re-use of PDCP SN at ARQ Level?", Tdoc R2-062825, 3GPP TSG-RAN2 Meeting #55, Oct. 9-13, 2006.
LG Electronics, "Issue on Packet Reordering", R2-062968, TSG-RAN Working Group 2 #55, Oct. 9-13, 2006, 2 pages.
Chinese Office Action dated Aug. 29, 2016 issued in counterpart application No. 201410158162.8, 14 pages.

* cited by examiner

METHOD AND APPARATUS FOR PERFORMING HANDOVER USING PACKET DATA CONVERGENCE PROTOCOL (PDCP) REORDERING IN MOBILE COMMUNICATION SYSTEM

PRIORITY

This application is a Continuation Application of U.S. application Ser. No. 11/875,315, which was filed in the U.S. Patent and Trademark Office on Oct. 19, 2007, and claims priority under 35 U.S.C. §119(a) to an application entitled "Method And Apparatus For Performing Handover While PDCP Reordering In Mobile Communication System" filed in the Korean Industrial Property Office on Oct. 19, 2006 and assigned Serial No. 10-2006-0101842, the contents of each of which are incorporated herein by reference.

BACKGROUND OF THE INVENTION

1. Field of the Invention

The present invention relates to a mobile communication system, and more particularly to a method and an apparatus for supporting handover between cells while a User Equipment (UE) performs packet reordering.

2. Description of the Related Art

A Universal Mobile Telecommunication Service (UMTS) system is a $3^{rd}$ Generation (3G) asynchronous mobile communication system, which uses wideband Code Division Multiple Access (CDMA) and is based on Global System for Mobile Communications (GSM) and General Packet Radio Services (GPRS), which are European mobile communication systems. The UMTS system is an example of cellular mobile communication systems, each of which includes a plurality of cells divided from an entire service area of the system and supports handover between cells in order to guarantee continuity of communication.

When an active UE moves from one cell (source cell) to another cell (target cell), the target cell establishes a communication path for the UE and re-establishes entities of each layer related to the established communication path. Especially, when the communication of the UE supports Automatic Retransmission reQuest (ARQ), it may sometimes become necessary for the target cell to re-establish an ARQ entity for the UE. As used here, handover re-establishing an ARQ entity refers to handover in which the source cell removes an existing ARQ being used therein and the target cell sets a new ARQ entity.

When handover re-establishing an ARQ entity is performed in a conventional mobile communication system, a higher layer entity of the ARQ entity performs accumulative retransmission. The accumulative retransmission can reduce the complexity of the higher layer entity although packets already transmitted in the source cell may be retransmitted in the target cell. In a conventional UMTS mobile communication system, the handover re-establishing an ARQ entity occurs during Serving Radio Network Subsystem (SRNS) reallocation during which a serving Radio Network Controller (RNC) of a UE is changed. Because the SRNS reallocation does not frequently occur, the accumulative retransmission is performed in consideration of complexity rather than efficiency.

Meanwhile, in the 3rd generation Partnership Project (3GPP), which is in charge of standardization of the UMTS, active discussion about Long Term Evolution (LTE) of the UMTS system as an evolved mobile communication system of the UMTS system is ongoing. The LTE is technology, which is targeting commercialization thereof by the year 2010 and the realization of high speed packet-based communication at a speed of about 100 Mbps. To this end, various schemes are being discussed, which include a scheme for reducing the number of nodes located in a communication path by simplifying the structure of a network, and a scheme for approaching a wireless protocol to a wireless channel as much as possible.

In an evolved mobile communication system such as the LTE system, an ARQ entity is located in a Node B that is a lower layer entity of the RNC. Therefore, an ARQ entity is always re-established in handover among Node Bs, and thus the handover re-establishing an ARQ entity occurs much more frequently in an evolved mobile communication system, such as the LTE system, than the UMTS system. Therefore, it is necessary to develop technology for improving communication efficiency in the handover re-establishing an ARQ entity in an evolved mobile communication system, such as the LTE system.

SUMMARY OF THE INVENTION

Accordingly, the present invention has been made to solve the above-mentioned problems occurring in the prior art, and the present invention provides a method and an apparatus for improving communication efficiency in handover re-establishing an ARQ entity in a mobile communication system.

In addition, the present invention provides a method and an apparatus for preventing loss or repeated transmission of data packets in handover re-establishing an ARQ entity.

In addition, the present invention provides a method and an apparatus for reordering by a higher layer entity of an ARQ entity, which can selectively retransmit packets not received in a source cell when a UE moved to a target cell.

In accordance with an aspect of the present invention, there is provided a method for performing handover by a User Equipment (UE) in a mobile communication system, the method includes transmitting first Packet Data Convergence Protocol (PDCP) Packet Data Units (PDUs) correctly received from the source cell, together with a special indication requiring reordering of the first PDCP PDUs, from a Radio Link Control (RLC) receiving buffer to a PDCP receiving entity when a handover command message from a source cell to a target cell is received; buffering the first PDCP PDUs in a PDCP PDU reordering buffer by the PDCP receiving entity in response to the special indication; and when a second PDCP PDU is received from the target cell through a new RLC receiving entity for the target cell, outputting third PDCP PDUs up to a PDCP PDU before a first missing PDCP PDU having a sequence number higher than that of the second PDCP PDU from the PDCP reordering buffer.

In accordance with another aspect of the present invention, there is provided a UE apparatus for performing handover in a mobile communication system, the UE apparatus includes an existing RLC receiving entity for receiving RLC PDUs from a source cell and assembling the RLC PDUs into PDCP PDUs before handover, and outputting first PDCP PDUs correctly received from the source cell, together with a special indication requiring reordering of the first PDCP PDUs, when a handover command message from a source cell to a target cell is received; a new RLC receiving entity for receiving one or more RLC PDUs containing a second PDCP PDU, which has not been correctly received from the source cell, from the target cell after the handover, and assembling the received RLC PDUs into the second PDCP PDU; and a PDCP receiving entity for buffering the first PDCP PDUs in a PDCP PDU reordering buffer in response to the special indication, and outputting third PDCP PDUs up to a PDCP PDU prior to a first missing PDCP PDU having a sequence number higher than that of the second PDCP PDU from the PDCP reordering buffer when the second PDCP PDU is delivered from the new RLC receiving entity.

In accordance with another aspect of the present invention, there is provided a method for performing handover by an Evolved Node B (ENB) in a mobile communication system, the method includes receiving by a target ENB controlling the target cell from the source ENB, first PDCP PDUs, which were not correctly received by a UE from a source ENB controlling a source cell due to handover of the UE from the source cell to a target cell; transmitting second PDCP PDUs together with a first indication from the target ENB to the UE, the second PDCP PDUs includes remaining PDCP PDUs of the first PDCP PDUs except for a last PDCP PDU from among the first PDCP PDUs, which is the first indication that each of the second PDCP PDUs is not the last PDCP PDU delivered from the source cell to the target cell; and transmitting the last PDCP PDU from the target ENB to the UE together with a second indication that the last PDCP PDU is the last PDCP PDU delivered from the source cell to the target cell.

In accordance with another aspect of the present invention, there is provided an Evolved Node B (ENB) apparatus for performing handover in a mobile communication system, the ENB apparatus includes a transmission buffer for storing first PDCP PDUs delivered from a source ENB controlling a source cell and storing PDCP PDUs delivered from an anchor node, wherein a UE has not correctly received the first PDCP PDUs from the source ENB due to handover of the UE from the source cell to a target cell; and a control unit for controlling the transmission buffer such that the transmission buffer transmits second PDCP PDUs together with a first indication to the UE and the last PDCP PDU together with a second indication to the UE, the second PDCP PDUs includes remaining PDCP PDUs of the first PDCP PDUs except for a last PDCP PDU from among the first PDCP PDUs, the first indication indicating that each of the second PDCP PDUs is not the last PDCP PDU delivered from the source cell to the target cell, the second indication indicating that the last PDCP PDU is the last PDCP PDU delivered from the source cell to the target cell.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description, detailed description of known functions and configurations incorporated herein will be omitted when it may make the subject matter of the present invention rather unclear. The main objective of the present invention is to prevent repeated transmission of data packets by using selective retransmission when handover re-establishing an ARQ entity occurs. Presently, a higher layer entity of the ARQ entity performs proper reordering operation for received data packets, so that selectively retransmitted packets are delivered to the higher layer in the same order as that in which the packets have been originally transmitted.

An LTE system will be briefly described as an illustrative example of the embodiments of the present invention.

Figure 1:
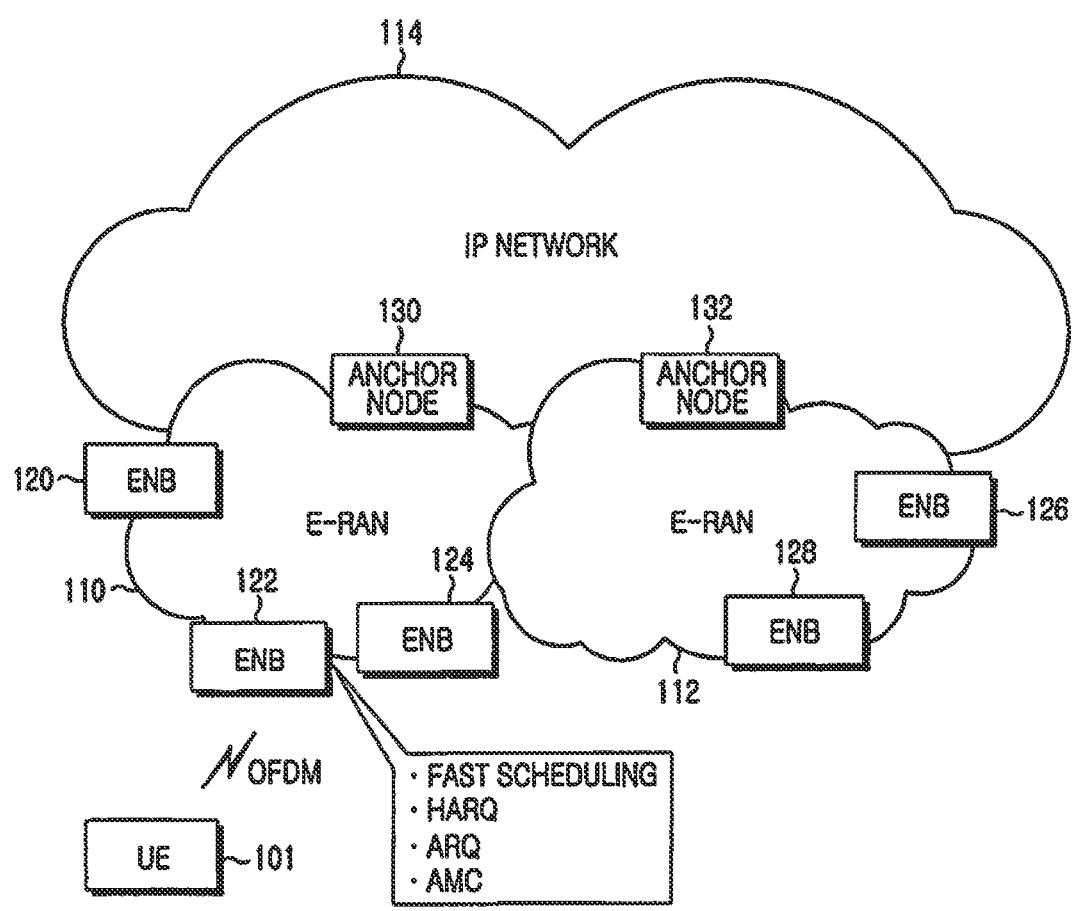
FIG. 1 is an overview of a structure of an LTE mobile communication system.

Referring to FIG. 1, an Evolved UMTS Radio Access Network (E-RAN) 110 or 112 has a simplified 2 node structure, which includes Evolved Node Bs (ENBs) 120, 122, 124, 126, and 128, and anchor nodes 130 and 132. A User Equipment (UE) 101 is connected to an Internet Protocol (IP) network 114 through the E-RANs 110 and 112.

ENBs 120 to 128 correspond to existing Node Bs of the UMTS system and are connected to UE 101 through a wireless channel. ENBs 120 to 128 perform scheduling by collecting situation information and have functions related to radio resource control. For example, the ENB is equipped with a control protocol, such as a Radio Resource Control (RRC) protocol.

In order to realize a maximum of a transmission speed of 100 Mbps, the LTE uses an Orthogonal Frequency Division Multiplexing (OFDM) scheme in a 20 MHz system bandwidth as wireless access technology. Further, the LTE system uses an Adaptive Modulation and Coding (AMC) scheme, which determines a modulation scheme and a channel coding rate in accordance with the channel status of a UE.

Figure 2:
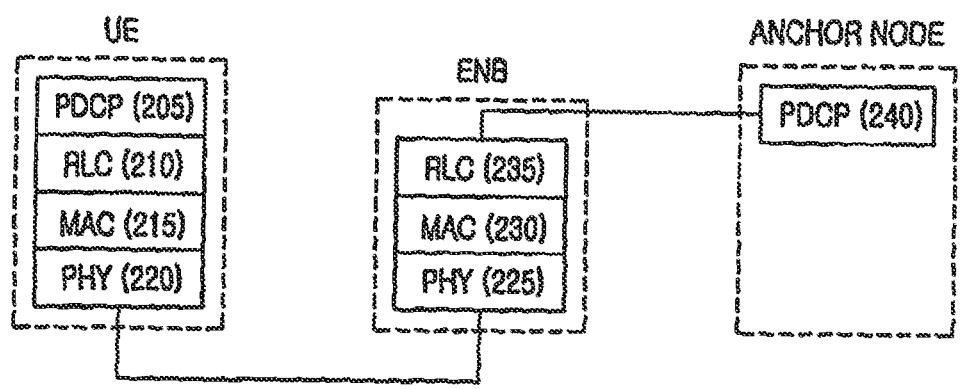
FIG. 2 illustrates a protocol stack of an LTE mobile communication system.

Referring to FIG. 2, Packet Data Convergence Protocol (PDCP) layers 205 and 240 perform operations, such as compression/decompression and ciphering/deciphering of an IP header, thereby generating PDCP Packet Data Units (PDUs). As used herein, a packet output from a particular protocol entity is called a PDU of the protocol. Each of Radio Link Control (RLC) layers 210 and 235 functions as an ARQ entity which reconstructs a PDCP PDU into RLC PDUs each having a proper size and performs an ARQ operation on the RLC PDUs. PDCP layers 205 and 240 and RLC layers 210 and 235 construct at least one PDCP entity or at least one RLC entity, which may be constructed according to each service or flow when the communication starts, and process data packets through each entity. As shown in FIG. 2, PDCP layers 205 and 240 are located in the UE and the anchor node, respectively, and RLC layers 210 and 235 are located in the UE and the ENB, respectively.

Medium Access Layer (MAC) layers 215 and 230 are connected to a plurality of RLC entities and perform multiplexing of RLC PDUs into a MAC PDU and demultiplexing of a MAC PDU into RLC PDUs. Physical layers 220 and 225 generate OFDM symbols by channel-coding and modulating higher layer data and transmit the generated OFDM symbols through a wireless channel, or demodulate and channel-decode OFDM symbols received through a wireless channel and transfer the OFDM symbols to a higher layer. Most of Hybrid ARQ (HARQ) operations, such as channel decoding of received packets, soft combining of packets with previously-received packets, CRC calculation, etc., are performed in physical layers 220 and 225, and MAC layers 215 and 230 control the HARQ operations.

As described above, RLC layers 210 and 235 guarantee reliable data transmission/reception through the ARQ process. Based on the foregoing, an entity of the RLC layer is called an ARQ entity.

Figure 3:
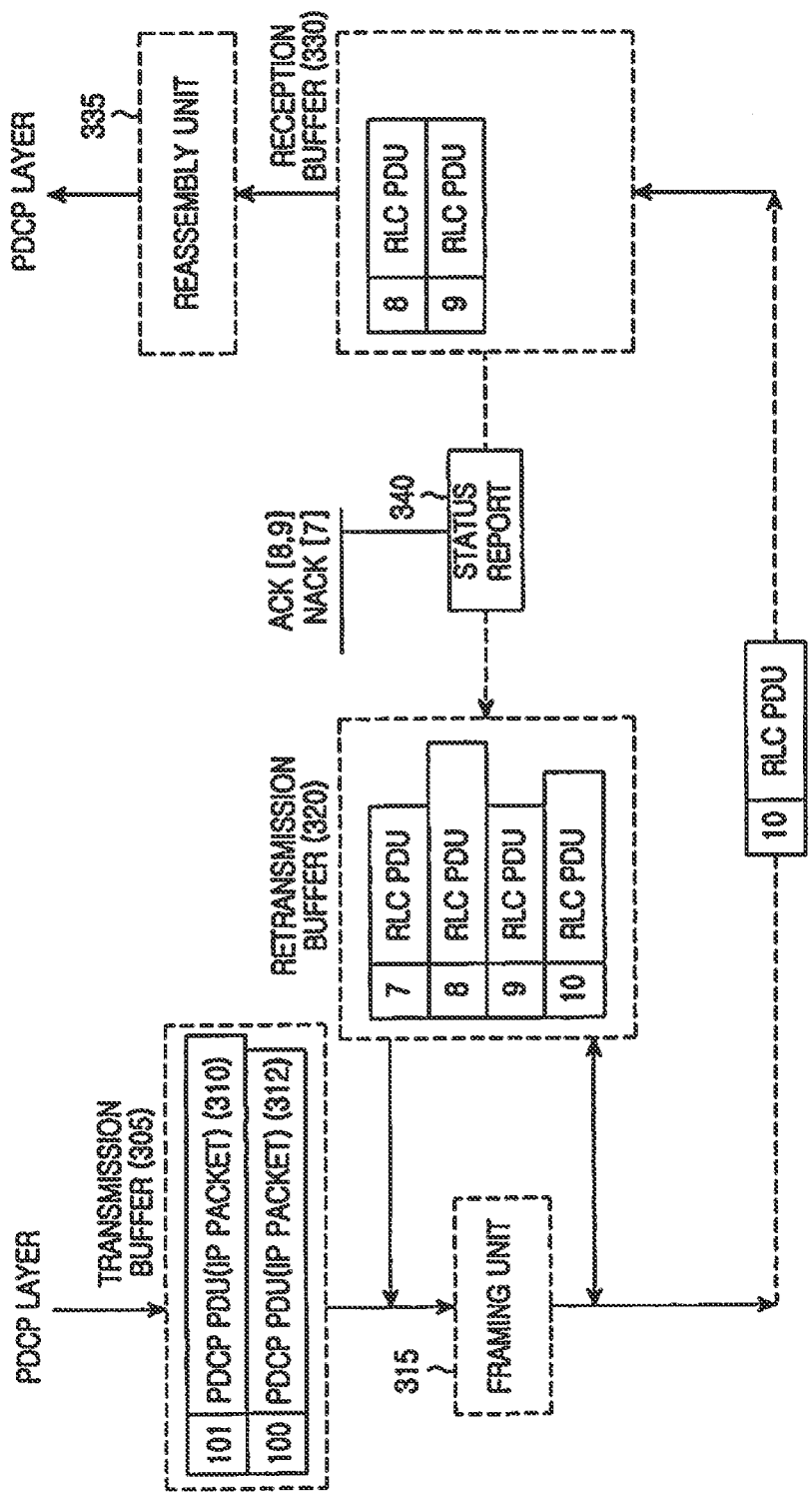
FIG. 3 illustrates an operation of an RLC layer in a mobile communication system.

Referring to FIG. 3, a transmission buffer 305 of a transmitter-side RLC layer stores PDCP PDUs 310 and 312 provided by the transmitter-side RLC layer, before transmitting the PDCP PDUs to a receiver-side RLC layer. Each of the PDCP PCUs includes a ciphered and header-compressed IP packet in a payload and includes a PDCP sequence number sequentially increasing one by one in a header. The sequence number corresponds to an "input value changing according to each packet," which is used for ciphering and deciphering of an IP packet. In most of currently known ciphering schemes, the security of ciphering is enhanced by using the "input value changing according to each packet" when a ciphering apparatus ciphers a packet. PDCP PDUs 310 and 312 are reconstructed into RLC PDUs each having the proper size by a framing unit 315, RLC sequence numbers increasing one by one are attached to the reconstructed RLC PDUs, and the RLC PDUs are transmitted to the receiver-side RLC layer. Then, the RLC PDUs are buffered in a retransmission buffer 320 when an Acknowledgement (ACK) signal is received from the receiver-side RLC layer.

The receiver-side RLC layer stores the received RLC PDUs in a reception buffer 330, detects RLC PDUs lost during the transmission by checking each sequence number, and makes a request for retransmission of the RLC PDUs lost during the transmission to the transmitter-side RLC layer. Hereinafter, for convenience of description, RLC PDU [x] indicates an RLC PDU having an RLC sequence number of x, and PDCP PDU [x] indicates a PDCP PDU having a PDCP sequence number of x.

An example of an ARQ operation performed by the RLC layer will be described. At one time point, from among RLC PDU [7] to RLC PDU [10] transmitted from the transmitter-side RLC layer, only RLC PDU [8] and RLC PDU [9] have been received by the receiver-side RLC layer and are stored in reception buffer 330. The receiver-side RLC layer replies to the transmitter-side RLC layer by sending a status report 340 reporting correct reception of RLC PDU [8] and RLC PDU [9] and failure in receiving RLC PDU [7]. Specifically, status report 340 includes ACK [8,9], which is an ACK signal including sequence numbers of 8 and 9, and NACK [7], which is a NACK signal including a sequence number of 7. Then, the transmitter-side RLC layer retransmits RLC PDU [7], which is stored in retransmission buffer 320 and requested to be retransmitted, and discards the correctly transmitted RLC PDU [8] and RLC PDU [9] from retransmission buffer 320. From among the RLC PDUs stored in reception buffer 330, RLC PDUs capable of constructing one complete PDCP PDU are constructed into a PDCP PDU by a reassembly unit 335 and the constructed PDCP PDU is then transferred to the receiver-side PDCP layer.

One important characteristic of the operation performed by the RLC layer is that, when the receiver-side RLC layer delivers PDCP PDUs to the receiver-side PDCP layer, the transmitter-side RLC layer delivers the PDCP PDUs in the same order as that in which the transmitter-side RLC layer has received the PDCP PDUs from the transmitter-side PDCP layer. This is called an "in-sequence delivery" operation. For example, even though RLC PDU [101] 310 can be reassembled by using RLC PDU [8] and RLC PDU [9], the receiver-side RLC layer does not reassemble RLC PDU [8] and RLC PDU [9] into RLC PDU [101] 310 and deliver the reassembled RLC PDU [101] 310 to the PDCP layer because the receiver-side RLC layer has not received RLC PDU [7] yet. When the receiver-side RLC layer has received the retransmitted RLC PDU [7] and the reception buffer 330 does not contain a missing RLC PDU any more, the reassembly unit 335 of the receiver-side RLC layer constructs a PDCP PDU by reassembling the RLC PDUs stored in the reception buffer 330 and delivers the constructed PDCP PDU to the receiver-side PDCP layer.

Since the RLC layer provides a reliable transmission/reception function and an "in-sequence delivery" function as described above, the PDCP layer does not require a separate buffering or sequence reordering function. However, when a UE performs handover to a cell belonging to another ENB, the UE should remove an ARQ entity (i.e. an RLC entity) having been used in a previous cell and should re-establish an RLC entity to be used in a new cell. Therefore, before the handover is completed, the RLC layer may be unable to provide an "in-sequence delivery" function and reliable transmission/reception function by an ARQ operation.

Figure 4:
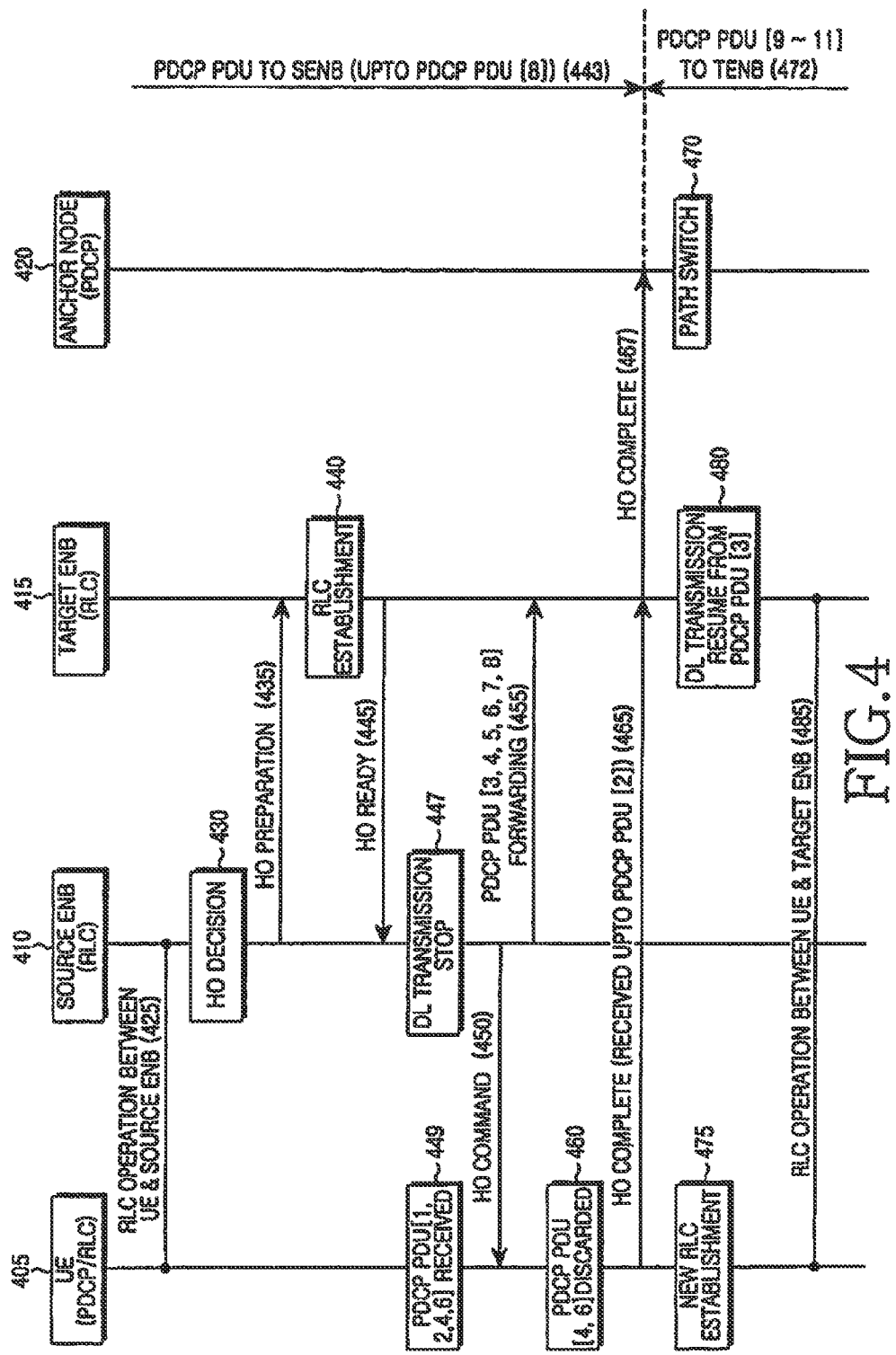
FIG. 4 is a signal flow diagram illustrating a process of handover re-establishing an ARQ entity when a UE moves to a new cell belonging to another ENB.

As shown in FIG. 4, UE 405 includes a PDCP receiving entity and an RLC receiving entity, each of a source ENB 410 controlling a source cell and a target ENB 415 controlling a target cell includes an RLC transmitting entity, and an anchor node 420 includes a PDCP transmitting entity.

Referring to FIG. 4, when RLC PDUs are transmitted between UE 405 and source ENB 410 (step 425), source ENB 410 determines handover of UE 405 to a cell of target ENB 415 (step 430). When source ENB 410 requests target ENB 415 to prepare itself for the handover (step 435), target ENB 405 makes preparations which enable UE 405 to instantly restart communication after the handover to target ENB 415, for example, target ENB 405 sets an RLC entity for UE 405 (step 440), and then reports to source ENB 410 that the preparation is completed (step 445). Then, source ENB 410 stops downlink transmission to UE 405 (step 447), and commands UE 405 to perform handover to target ENB 415 (step 450). Here, data transmission/reception up to the time point at which the command is transmitted is based on the following assumptions.

Anchor node 420 has transmitted PCDP PDU [1] to PDCP PDU [8] to source ENB 410.
    Source ENB 410 has transmitted RLC PDUs corresponding to PCDP PDU [1] to PDCP PDU [8] to UE 405. PDCP PDU [7] and PDCP PDU [8] have not been transmitted yet.

From among the RLC PDUs, UE 405 has correctly received the RLC PDUs corresponding to PCDP PDU [1], PDCP PDU [2], PDCP PDU [4], and PDCP PDU [6] (step 449).

UE 405 reports to source ENB 410 through an RLC status report that UE 405 has correctly received the RLC PDUs corresponding to PCDP PDU [1] and PDCP PDU [2].

From among the sequence-ordered RLC PDUs, UE 405 assembles PCDP PDU [1] and PDCP PDU [2] and delivers the assembled PDUs to the PDCP receiving entity.

An RLC receiving entity of UE 405 stores RLC PDUs corresponding to PCDP PDU [4] and PDCP PDU [6].

Source ENB 410 delivers PDCP PDU [3] to PDCP PDU [6], for which an ACK signal of an RLC level has not been received yet from UE 405, and PDCP PDU [7] and PDCP PDU [8], which have not transmitted to UE 405 yet, to target ENB 415 (step 455).

Upon receiving the handover command, UE 405 removes out-of-sequence RLC PDUs from the reception buffer and removes the existing RLC entity (the RLC entity performed communication with the source cell). Then, together with the existing RLC entity, the RLC PDUs corresponding to PCDP PDU [4] and PDCP PDU [6] are removed (step 460). Thereafter, UE 405 performs handover to target ENB 415, and then constructs a new RLC entity for communication with target ENB 415 and transmits a handover complete message to target Node message 415 (step 465). The handover complete message includes sequence numbers of the correctly received PDCP PDUs. For example, because the PDCP receiving entity of UE 405 has correctly received PDCP PDU [1] and PDCP PDU [2], the handover complete message includes information indicating that PDCP PDUs have been received up to PDCP PDU [2].

When target ENB 415 has received the handover complete message, target ENB 415 requests anchor node 420 to change the downlink data path because UE 405 has performed the handover (step 467), and determines to retransmit PDCP PDU [3] to PDCP PDU [6], which the PDCP receiving entity of UE 405 has not received yet, from among the PDCP PDUs received from source ENB 410, by using the RLC entity newly constructed for UE 405 (step 480). In response to the request from target ENB 415, anchor node 420 switches the downlink data path for UE 405 from source ENB 410 to target ENB 415, and transmits the following PDCP PDUs delivered to source ENB 410, that is, PDCP PDU [9] to PDCP PDU [11], to target ENB 415. Meanwhile, target ENB 415 transmits PDCP PDU [3] and the PDCP PDUs following thereafter to UE 450 by using the newly constructed RLC entity.

As shown in FIG. 4, when target ENB 415 resumes transmission of PDCP PDUs from a PDCP PDU after the sequence-ordered PDCP PDUs in spite of a possibility that the transmission may be a repeated retransmission, the PDCP receiving entity does not need to either separately buffer the received PDCP PDUs or reorder the PDCP PDUs. That is, the PDCP receiving entity immediately inputs the PDCP PDUs delivered from the RLC receiving entity into a deciphering entity and a header decompression entity.

However, if the target ENB transmits only the PDCP PDUs that the UE has not received, the PDCP PDUs require separate buffering and reordering. The reordering refers to an operation of reordering received packets according to their sequence numbers and then delivering the reordered packets to a next processing block while storing the out-of-sequence packets until they become in-sequence through sequence-reordering. Here, the out-of-sequence packets imply that there is a missing packet (i.e. a packet not received yet). That is, when there is a missing packet, packets having sequence numbers higher than the sequence number of the missing packet are assumed as out-of-sequence packets. The reordering entity temporarily stores the out-of-sequence packets either before the missing packet is received or until it is concluded that the missing packet is completely lost. An efficient reordering operation depends on how fast it is possible to detect a loss of the missing packet and deliver the packets having sequence numbers higher than the sequence number of the lost packet to a next processing block, when it is concluded that the missing packet has been completely lost.

According to the first embodiment of the present invention, the PDCP receiving entity of the UE temporarily stores the out-of-sequence PDCP PDUs in a reception buffer, from among the correctly received PDCP PDUs from the source ENB, and when it receives a PDCP PDU from a target cell, the PDCP receiving entity determines that sequence reordering of the PDCP PDUs having sequence numbers lower than that of the received PDCP PDU has been completed. This is based on the fact that the RLC receiving entity of the UE performs the "in-sequence delivery" operation, so that reception of a PDCP PDU having a sequence number of x by a PDCP receiving entity implies that there is no possibility that the PDCP receiving entity can receive another PDCP PDU having a sequence number lower than x.

Figure 5:
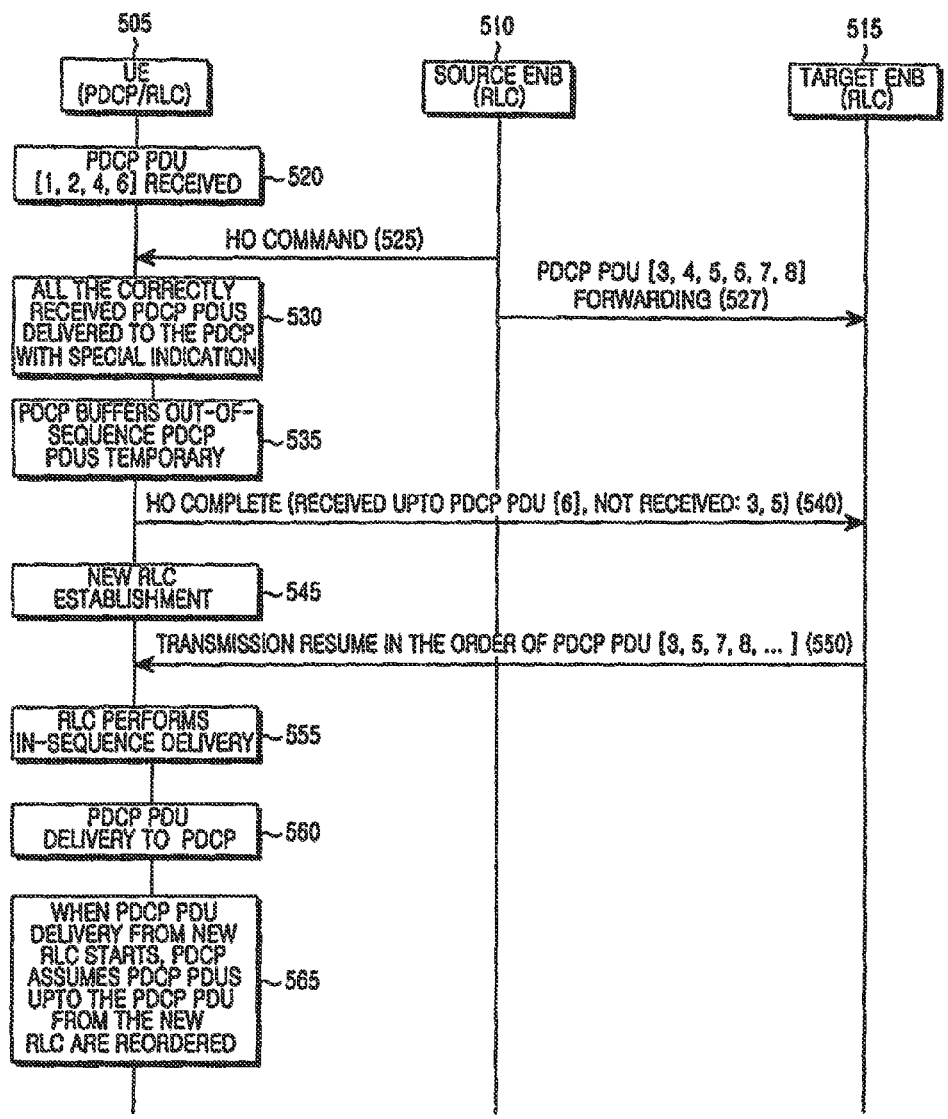
FIG. 5 is a message flow diagram illustrating an example of the entire process according to the present invention.

Referring to FIG. 5, before receiving the handover command from source ENB 510, UE 505 receives RLC PDUs corresponding to PDCP PDU [1], PDCP PDU [2], PDCP PDU [4], and PDCP PDU [6] from the source ENB 510 (step 520). From among the RLC PDUs, because RLC PDUs corresponding to PDCP PDU [1] and PDCP PDU [2] are already in sequence, they are assembled into PDCP PDU [1] and PDCP PDU [2], which are then delivered to the PDCP receiving entity first.

When UE 505 receives the handover command from source ENB 510 (step 525), the UE assembles all RLC PDUs fit for assembly from among the RLC PDUs remaining in the RLC reception buffer into PDCP PDUs and then delivers the assembled PDCP PDUs to the PDCP receiving entity (step 530). At this time, PDCP PDU [4] and PDCP PDU [6] are assumed to have been correctly received and are delivered to the PDCP receiving entity. Also, the RLC receiving entity of UE 505 delivers to the PDCP receiving entity, together with the correctly received PDCP PDUs, a special indication that the out-of-sequence PDCP PDUs require sequence-reordering. From the special indication, the PDCP receiving entity recognizes that PDCP PDU [3] and PDCP PDU [5] have not been received yet, and temporarily stores PDCP PDU [4] and PDCP PDU [6], which are out-of-sequence PDCP PDUs, in a reordering buffer, instead of delivering them to a next processing block (step 535).

After performing the handover to the target ENB 515, UE 505 transmits a handover complete message to target ENB 515 (step 540). The handover complete message contains information on a PDCP PDU reception status, that is, sequence numbers of missing PDCP PDUs and sequence numbers of received PDCP PDUs. In the illustrated example, the handover complete message contains PDCP PDU reception status information that PDCP PDUs up to PDCP PDU [6] have been received, while PDCP PDU [3] and PDCP PDU [5] are missing.

After transmitting the handover complete message, UE 505 establishes a new RLC entity to be used in target ENB 515 (step 545), and waits for arrival of RLC PDUs to the new RLC receiving entity from target ENB 515.

Meanwhile, target ENB 515 receives PDCP PDUs from source ENB 510 (step 527). Then, upon receiving the handover complete message from UE 505, target ENB 515 determines the PDCP PDUs to be transmitted by referring to the PDCP PDU reception status information contained in the handover complete message and then transmits the determined PDCP PDUs by referring to the sequence numbers of the determined PDCP PDUs (step 550). In the illustrated example, target ENB 515 transmits the PDCP PDUs in a sequence of PDCP PDU [3], PDCP PDU [5], PDCP PDU [7], and PDCP PDU [8] from among PDCP PDU [3], PDCP PDU [4], PDCP PDU [5], PDCP PDU [6], PDCP PDU [7], and PDCP PDU [8] received from source ENB 510. At this time, PDCP PDU [4] and PDCP PDU [6] may be discarded by target ENB 515. Target ENB 515 reconstructs the PDCP PDUs into RLC PDUs in the above-mentioned order, attaches RLC sequence numbers to the RLC PDUs, and then transmits the RLC PDUs to the RLC receiving entity of the UE. Since a sequence number of the RLC transmitting entity constructed in target ENB 515 is initialized to 0, target ENB 515 grants a sequence number of 0 to the first RLC PDU corresponding to PDCP PDU [3].

Target ENB 515 and UE 505 restart normal RLC transmission/reception through new RLC transmission and reception entities (step 555), and the RLC receiving entity of UE 505 assembles the reordered in-sequence RLC PDUs into PDCP PDUs and delivers the assembled PDCP PDUs to the PDCP receiving entity (step 560). During the RLC transmission/reception, transmission/reception of a certain RLC PDU may result in a complete failure. This may happen, for example, when the RLC PDU is not correctly transmitted with a predetermined time interval or when retransmission has been tried up to the maximum number of times allowed for retransmission without a successful retransmission. When reception of the missing RLC PDU is concluded as a failure after all, the RLC receiving entity performs the "in-sequence delivery" operation while ignoring the existence of the missing RLC PDU. That is, from among the reordered in-sequence RLC PDUs based on an assumption that the missing RLC PDU has been received, RLC PDUs fit to be PDCP PDUs are assembled into PDCP PDUs, which are then delivered to the PDCP receiving entity.

Since the RLC receiving entity performs the "in-sequence delivery" operation as described above, there is no possibility that another PDCP PDU having a sequence number lower than that of the PDCP PDU delivered by the RLC receiving entity constructed for use in the target cell may be received. Therefore, the PDCP receiving entity can determine that the PDCP PDUs are in sequence up to the PDCP PDU delivered from the RLC transmitting entity of the target cell (step 565). For example, if the PDCP receiving entity has received PDCP PDU [5] from the new RLC receiving entity without receiving PDCP PDU [3], the PDCP receiving entity concludes that PDCP PDU [3] having a sequence number lower than that of PDCP PDU [5] is completely lost and that the PDCP PDUs are in sequence up to PDCP PDU [5].

The entire operation according to the first embodiment of the present invention can be summarized as follows:

Upon receiving a handover command, the RLC receiving entity of the UE assembles all qualified RLC PDUs into PDCP PDUs and delivers the PDCP PDUs to the PDCP receiving entity. At this time, the RLC receiving entity delivers, together with the PDCP PDUs, a special indication that the out-of-sequence PDCP PDUs require sequence-reordering to the PDCP receiving entity.

Upon receiving the PDCP PDUs and the special indication, the PDCP receiving entity checks the sequence numbers of the received the PDCP PDUs and stores out-of-sequence PDCP PDUs, that is, the PDCP PDUs having sequence numbers higher than the sequence number of the missing PDCP PDU, in the reordering buffer.

The PDCP receiving entity delivers a PDCP PDU reception status to a Radio Resource Control (RRC) entity of the UE.

The RRC entity of the UE inserts the PDCP PDU reception status in the handover complete message and then transmits the handover complete message to the target ENB.

An RRC entity of the target ENB delivers the PDCP PDU reception status to the RLC receiving entity constructed for the UE.

Based on the PDCP PDU reception status, the RLC transmitting entity transmits PDCP PDUs according to their sequence numbers, except for the PDCP PDUs which the UE already received from the source ENB from among the PDCP PDUs delivered from the source ENB.

After the handover complete message is transmitted, the RLC receiving entity of the UE performs the "in-sequence delivery" operation for the RLC PDUs received from the RLC receiving entity of the target ENB.

Upon receiving a PDCP PDU from the new RLC transmitting entity, the PDCP receiving entity of the UE assumes that the PDCP PDUs are in sequence up to the received PDCP PDU, and delivers all PDCP PDUs having sequence numbers lower than a sequence number of a first missing PDCP PDU, which is higher than a sequence number of the PDCP PDU received from the new RLC transmitting entity, from among the PDCP PDUs stored in the reordering buffer, to a next processing block.

The PDCP receiving entity of the UE performs the reordering operation until no stored PDCP PDU remains in the reordering buffer.

Figure 6:
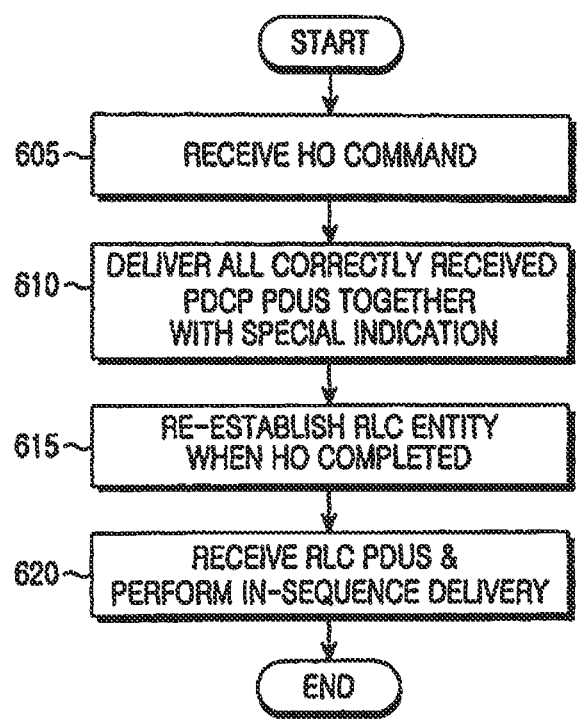
FIG. 6 is a flow diagram illustrating a process of RLC reception by a UE according to the present invention.

In step 605 of FIG. 6, the UE receives a handover command from the source ENB. In step 610, the RLC receiving entity of the UE assembles the qualified RLC PDUs into PDCP PDUs and delivers the assembled PDCP PDUs together with a special indication requiring reordering of the PDCP PDUs to the PDCP receiving entity.

After performing the handover to the target cell, the UE transmits a handover complete message to the target ENB in step 615. Then, the UE removes the existing RLC receiving entity and constructs a new RLC receiving entity for connection with the target cell. Then, in step 620, the newly constructed RLC receiving entity performs an "in-sequence deliver" operation for the RLC PDUs received from the target cell.

Figure 7:
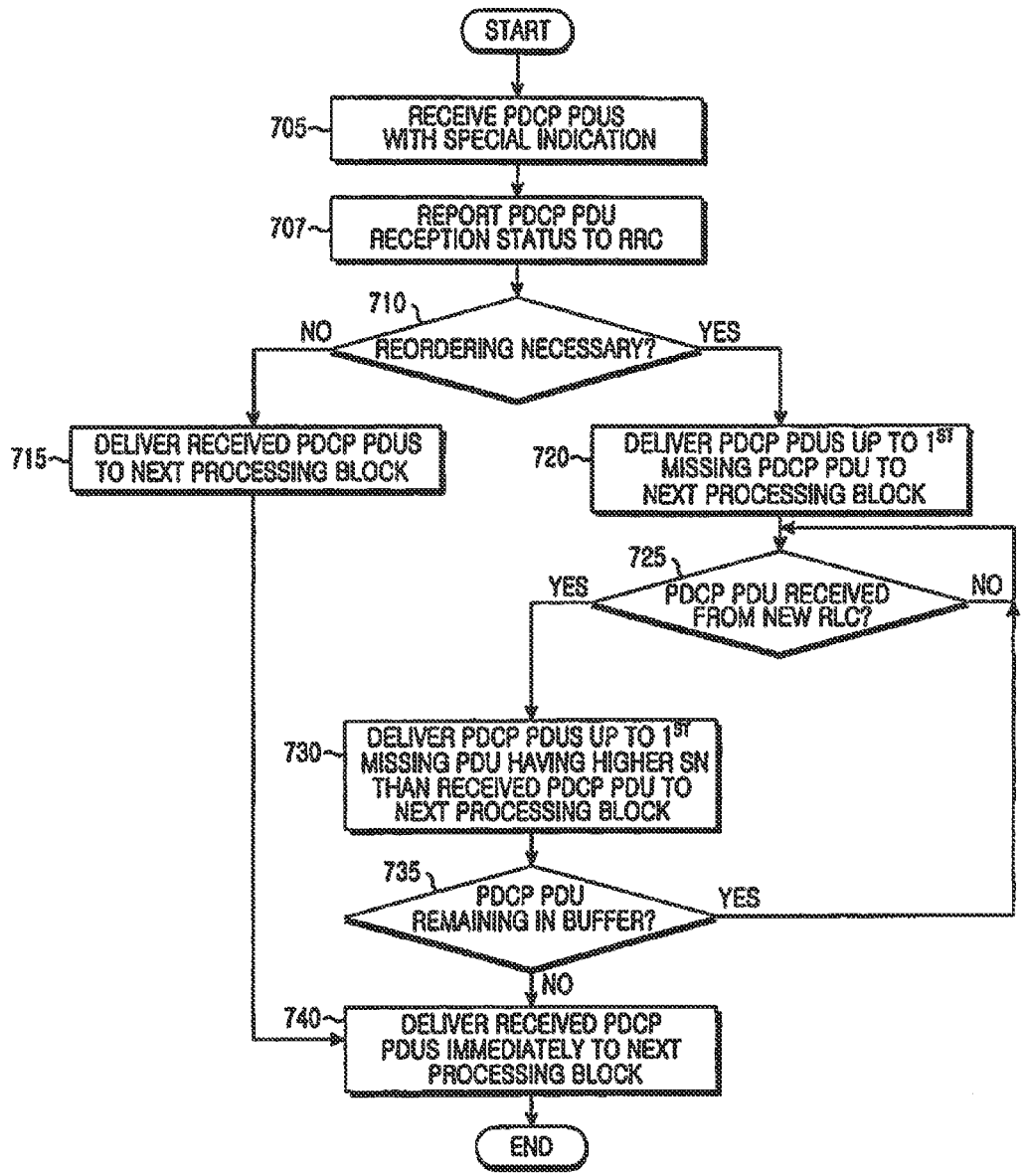
FIG. 7 is a flow diagram illustrating an operation of a PDCP receiving entity according to the present invention.

Referring to FIG. 7, when PDCP PDUs together with a special indication requiring reordering are delivered from the RLC receiving entity in step 705, the PDCP receiving entity obtains sequence numbers of correctly received PDCP PDUs and missing PDCP PDUs by checking the sequence numbers of the delivered PDCP PDUs, and reports the obtained sequence numbers to the RRC entity of the UE for use in reporting the PDCP reception status of the UE in step 707. The RRC entity inserts the PDCP reception status of the UE in the handover complete message transmitted to the target ENB.

In step 710, the PDCP receiving entity checks if it is necessary to reorder the PDCP PDUs delivered from the RLC receiving entity. Based on a result of the checking, the PDCP receiving entity proceeds to step 720 when the reordering is necessary, and proceeds to step 715 when the reordering is unnecessary. When the reordering is necessary, it implies that there is at least one missing PDCP PDU.

In step 715, the PDCP receiving entity delivers the received PDCP PDUs to a next processing block. Then, in step 740, the PDCP receiving entity performs normal operations for the PDCP PDUs received thereafter. In other words, the PDCP receiving entity immediately delivers the PDCP PDUs from the RLC receiving entity to the next processing block.

In step 720, the PDCP receiving entity delivers the reordered PDCP PDUs, that is, PDCP PDUs having sequence numbers lower than a sequence number of a first missing PDCP PDU, to a next processing block, and stores the remaining PDCP PDUs requiring reordering in the reordering buffer. Then, in step 725, the PDCP receiving entity waits until a PDCP PDU is delivered from the RLC receiving entity newly constructed for the target cell. When a PDCP PDU is delivered from the RLC receiving entity newly constructed for the target cell, the PDCP receiving entity proceeds to step 730, in which the PDCP receiving entity assumes all PDCP PDUs which have sequence numbers higher than a sequence number of the delivered PDCP PDU, up to the first missing PDCP PDU, as in-sequence PDCP PDUs, and outputs the assumed in-sequence PDCP PDUs to a next processing block.

Thereafter, in step 735, the PDCP receiving entity checks if out-of-sequence PDCP PDUs remains in the reordering buffer. Then, when out-of-sequence PDCP PDUs remains in the reordering buffer, the PDCP receiving entity proceeds to step 725, in which the PDCP receiving entity keeps on performing the reordering operation. When out-of-sequence PDCP PDUs don't remain in the reordering buffer, the PDCP receiving entity proceeds to step 740 in which the PDCP receiving entity performs the normal operations.

The first embodiment of the present invention corresponds to a case where a target ENB reorders PDCP PDUs received from a source ENB and PDCP PDUs received from an anchor node and then transmits the reordered PDCP PDUs. A second embodiment of the present invention proposes operations of PDCP and RLC when a target ENB transmits PDCP PDUs without reordering them.

It is preferred that the PDCP PDUs, which a target ENB receives from a source ENB, have sequence numbers always lower than those of the PDCP PDUs received by an anchor node, and that the target ENB transmits the PDCP PDUs received from the source ENB first of all. However, since the PDCP PDUs from the source ENB are delivered to the target ENB after passing through the anchor node, there is a possibility that they may arrive at the target ENB later than the PDCP PDUs directly delivered to the target ENB from the anchor node. For the sake of transmission efficiency, it is not preferred that the target ENB stops downlink transmission until the PDCP PDUs from the source ENB arrive.

Therefore, the target ENB first transmits a first-received PDCP PDU to the UE from among the PDCP PDUs received from the source ENB or the anchor node. Then, it is highly probable that the UE may receive the PDCP PDUs in reverse order. Further, there is no possibility that another PDCP PDU having a sequence number lower than that of the PDCP PDU delivered from the source ENB may be received. However, up to the time when there is no more PDCP PDU delivered from the source ENB, there is still a possibility that a PDCP PDU having a sequence number lower than that of the PDCP PDU delivered from the anchor node may be received. According to the second embodiment of the present invention, the target ENB first transmits a first-arrived PDCP PDU to the UE from among the PDCP PDUs delivered from the source ENB or the anchor node. Further, when the target ENB transmits the PDCP PDU delivered from the source ENB, the target ENB transmits, together with the PDCP PDU, an indication that "since the PDCP PDU is a PDCP PDU delivered from the source ENB, there is no possibility that the PDCP receiving entity may receive another PDCP PDU having a sequence number lower than that of the PDCP PDU, and thus the PDCP receiving entity should deliver, upon receiving the PDCP PDU, PDCP PDUs up to a first missing PDCP PDU having a sequence number higher than that of the PDCP PDU to a next processing block." Hereinafter, for convenience of description, this indication will be referred to as indication 1. Briefly, indication 1 is an indication for commanding the PDCP receiving entity to apply the reordering operation according to the first embodiment of the present invention. Indication 1 can be delivered as control information of an RLC PDU containing at least a part of the PDCP PDU.

Figure 8:
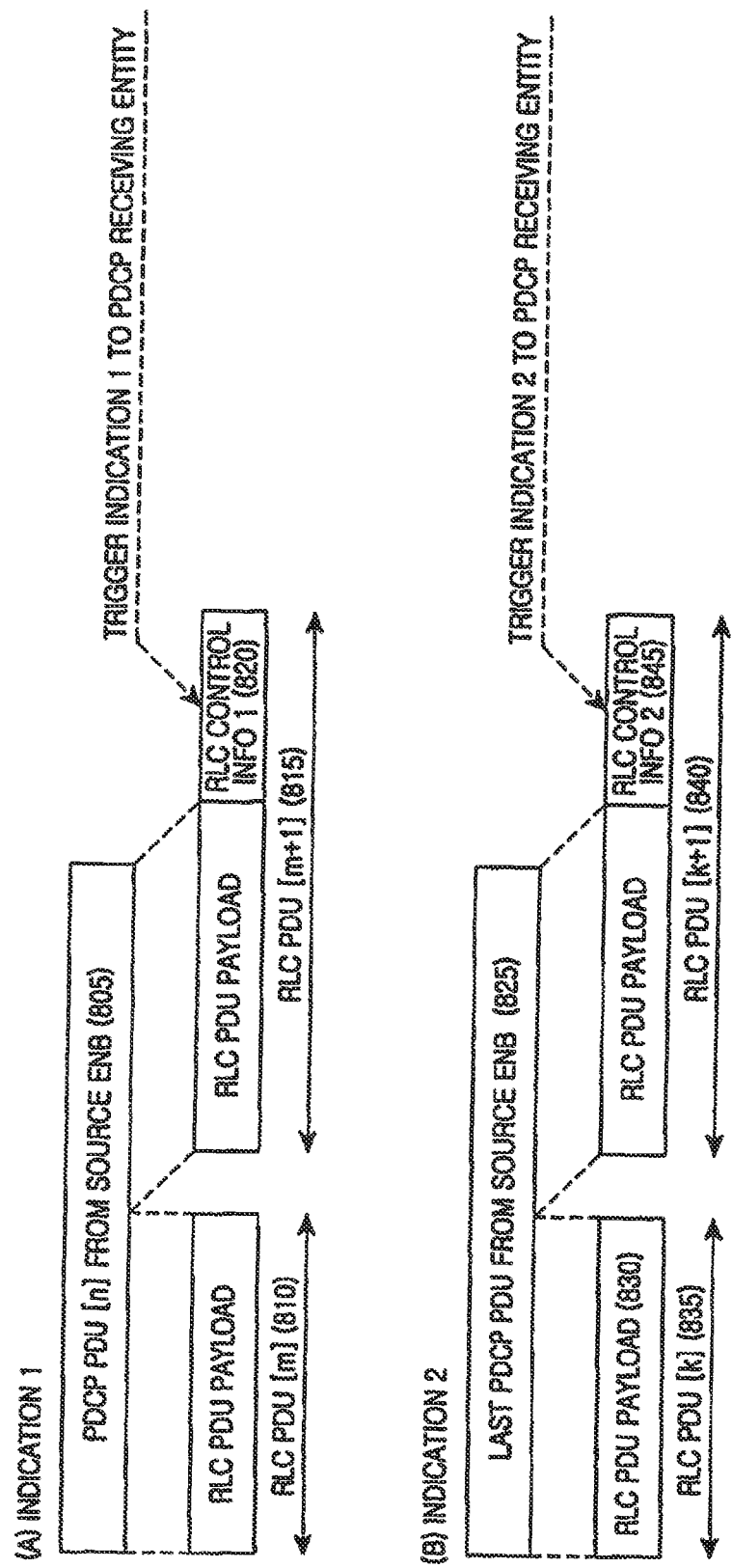
FIG. 8 illustrates an example of RLC control information according to the present invention.

Referring to FIG. 8, an RLC transmitting entity of a target ENB reconstructs PDCP PDU [n] 805 delivered from a source ENB into RLC PDU [m] 810 and RLC PDU [m+1] 815, and then transmits reconstructed RLC PDU [m] 810 and RLC PDU [m+1] 815. At this time, the RLC transmitting entity of the target ENB attaches "control information 820 commanding delivery of indication 1 together with the current RLC PDU when the PDCP PDU reconstructed into the current RLC PDU is delivered to a PDCP receiving entity" to the last RLC PDU reconstructed from PDCP PDU [n] 805, that is, to RLC PDU [m+1] 815. Hereinafter, for convenience of description, this control information 820 is referred to as "RLC control information 1."

A PDCP receiving entity of the UE applies the reordering operation proposed by the first embodiment of the present invention to the PDCP PDU delivered together with indication 1. That is, there is no possibility that a PDCP PDU having a sequence number lower than that of the PDCP PDU delivered together with indication 1 may be further received. The PDCP receiving entity ignores the possible existence of a missing PDCP PDU having a sequence number lower than that of the PDCP PDU delivered together with indication 1 and delivers all PDCP PDUs having sequence numbers lower than a sequence number of a first missing PDCP PDU, which is higher than a sequence number of the PDCP PDU delivered together with indication 1, to a next processing block.

When the PDCP receiving entity has received the last PDCP PDU delivered from the source ENB to the target ENB, there is no possibility that a PDCP PDU having a sequence number lower than that of the last PDCP PDU may be further received, and a further reordering operation is meaningless. For example, even when the PDCP PDUs delivered from an anchor node are stored in a buffer of the PDCP receiving entity due to a missing PDCP PDU, there is no possibility that the missing PDCP PDU may be received after the last PDCP PDU is received.

Therefore, according to the second embodiment of the present invention, when the target ENB transmits the last PDCP PDU received from the source ENB to the UE, the target ENB transmits an indication 2 together with the last PDCP PDU. Indication 2 instructs the PDCP receiving entity of the UE to deliver all out-of-sequence PDCP PDUs to a next processing block. Upon receiving indication 2 together with the PDCP PDU, the PDCP receiving entity of the UE delivers all out-of-sequence PDCP PDUs stored in the buffer to a next processing block and then performs normal operations. Indication 2 also may be delivered as RLC control information of the last RLC PDU containing at least a part of the PDCP PDU.

Referring to FIG. 8, the RLC transmitting entity reconstructs PDCP PDU 825 delivered from the source ENB into RLC PDU [k] 835 and RLC PDU [k+1] 840 and then transmits reconstructed RLC PDU [k] 835 and RLC PDU [k+1] 840. At this time, the RLC transmitting entity attaches "control information 845 commanding delivery of indication 2 together with the current RLC PDU when the PDCP PDU reconstructed into the current RLC PDU is delivered to a PDCP receiving entity" to the last RLC PDU reconstructed from PDCP PDU 825, that is, to RLC PDU [k+1] 840. Hereinafter, for convenience of description, control information 845 is referred to as "RLC control information 2."

Figure 9:
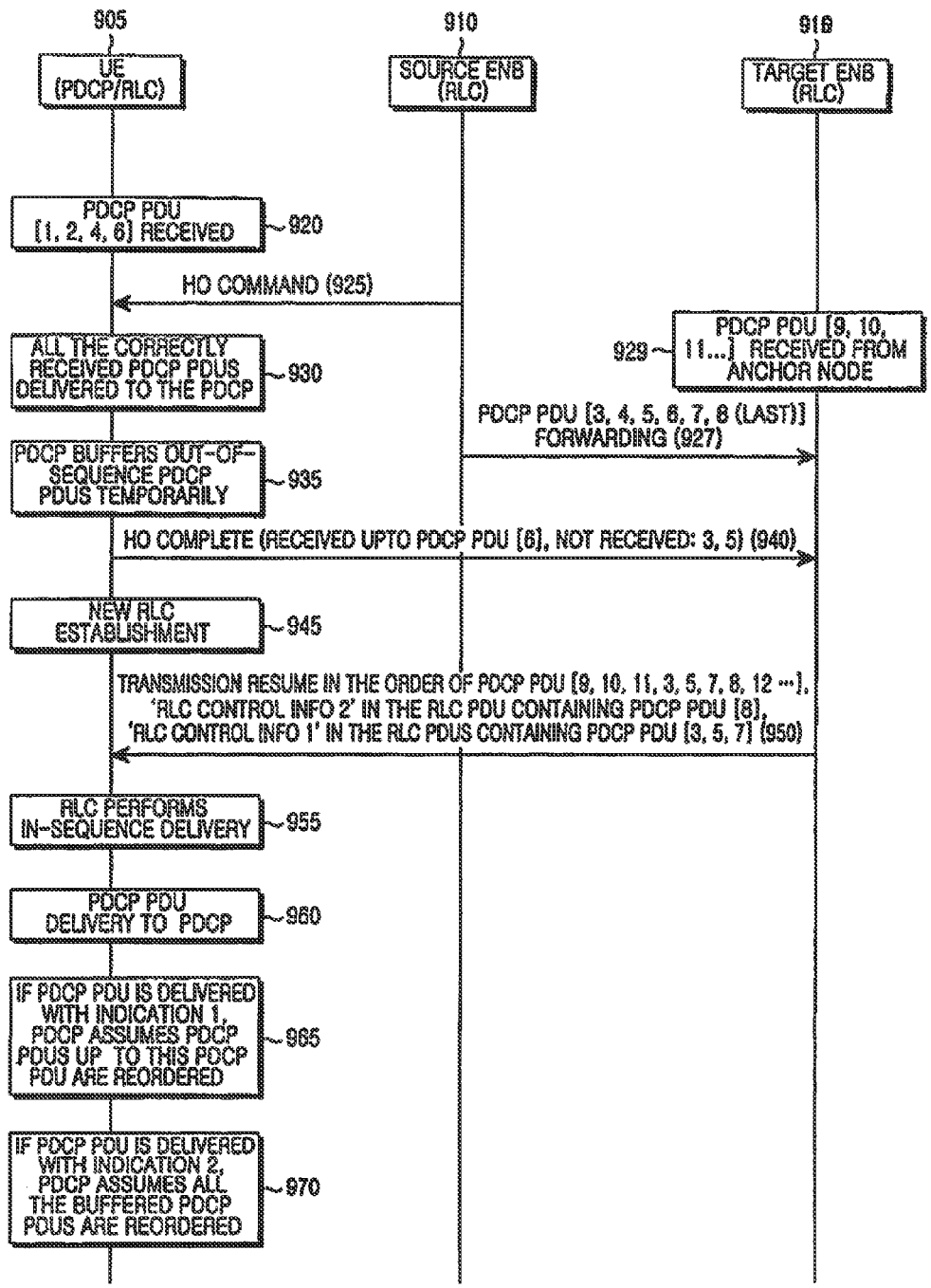
FIG. 9 is a message flow diagram illustrating an example of the entire process according to the present invention.

Referring to FIG. 9, before receiving the handover command from source ENB 910, UE 905 receives RLC PDUs corresponding to PDCP PDU [1], PDCP PDU [2], PDCP PDU [4], and PDCP PDU [6] from the source ENB 910 in step 920. From among the RLC PDUs, because RLC PDUs corresponding to PDCP PDU [1] and PDCP PDU [2] are already in sequence, they are assembled into PDCP PDU [1] and PDCP PDU [2], which are then delivered to the PDCP receiving entity first.

When UE 905 receives the handover command from source ENB 910 in step 925, UE 905 assembles all assemblable RLC PDUs from among the RLC PDUs remaining in the RLC reception buffer into PDCP PDUs, and then delivers the assembled PDCP PDUs to the PDCP receiving entity in step 930. At this time, PDCP PDU [4] and PDCP PDU [6] are assumed to have been correctly received and are delivered to the PDCP receiving entity. Also, the RLC receiving entity of UE 905 delivers to the PDCP receiving entity, together with the correctly received PDCP PDUs, a special indication that the out-of-sequence PDCP PDUs require sequence-reordering. From the special indication, the PDCP receiving entity recognizes that PDCP PDU [3] and PDCP PDU [5] are missing, and temporarily stores PDCP PDU [4] and PDCP PDU [6], which are out-of-sequence PDCP PDUs, in a reordering buffer instead of delivering them to a next processing block in step 935.

After performing the handover to target ENB 915, UE 905 transmits a handover complete message to target ENB 915 in step 940. The handover complete message contains information on a PDCP PDU reception status, that is, sequence numbers of missing PDCP PDUs and sequence numbers of received PDCP PDUs. In the illustrated example, the handover complete message contains PDCP PDU reception status information that PDCP PDUs up to PDCP PDU [6] have been received while PDCP PDU [3] and PDCP PDU [5] are missing.

After transmitting the handover complete message, UE 905 establishes a new RLC entity to be used in target ENB 915 in step 945, and waits for the arrival of RLC PDUs to the new RLC receiving entity from target ENB 915.

Meanwhile, target ENB 915 receives PDCP PDUs from source ENB 910 and the anchor node. Here, the description is based on a case where the PDCP PDUs from the anchor node arrive first. That is, PDCP PDUs from PDCP PDU [9] start to be received from the anchor node in step 929, and PDCP PDU [3] to PDCP PDU [8] are received from source ENB 910 in step 927. The RLC transmitting entity newly constructed in target ENB 915 stores the received PDCP PDUs in a transmission buffer in the order in which they were received. Specifically, they are stored in the transmission buffer in an order of PDCP PDU [9], PDCP PDU [10], PDCP PDU [11], PDCP PDU [3], PDCP PDU [5], PDCP PDU [6], PDCP PDU [7], PDCP PDU [8], PDCP PDU [12], and so on.

Then, upon receiving the handover complete message from UE 905, target ENB 915 determines the PDCP PDUs to be transmitted by referring to the PDCP PDU reception status information contained in the handover complete message, and then transmits the determined PDCP PDUs by referring to the sequence numbers of the determined PDCP PDUs in step 950. In the illustrated example, from among PDCP PDU [3]~PDCP PDU [8] received from source ENB 910, only PDCP PDU [3], PDCP PDU [5], PDCP PDU [7], and PDCP PDU [8] are transmitted to UE 905. Also, the PDCP PDUs are transmitted in the order in which they are stored in the transmission buffer, that is, in an order of PDCP PDU [9], PDCP PDU [10], PDCP PDU [11], PDCP PDU [3], PDCP PDU [5], PDCP PDU [6], PDCP PDU [7], PDCP PDU [8], and PDCP PDU [12]. Since a sequence number of the RLC transmitting entity constructed in target ENB 915 is initialized to 0, target ENB 915 grants a sequence number of 0 to the first RLC PDU corresponding to PDCP PDU [3].

UE 905 performs the "in-sequence delivery" operation according to an RLC receiving operation by the new RLC receiving entity in step 955, assembles the in-sequence RLC PDUs into PDCP PDUs, and then delivers the assembled PDCP PDUs to the receiving entity in step 960. At this time, the PDCP PDU constructed by assembling the RLC PDUs containing RLC control information 1 is delivered together with indication 1 to the PDCP receiving entity, and the PDCP PDU constructed by assembling the RLC PDUs containing RLC control information 2 is delivered together with indication 2 to the PDCP receiving entity.

Upon receiving the PDCP PDU from the RLC receiving entity newly constructed in the target cell, the PDCP receiving entity checks if the received PDCP PDU is accompanied by indication 1 or indication 2. When the received PDCP PDU is accompanied by indication 1, the PDCP receiving entity assumes that the PDCP PDUs are in sequence up to the received PDCP PDU, and delivers PDCP PDUs up to the first missing PDCP PDU having a sequence number higher than that of the received PDCP PDU to a next processing block in step 965. In contrast, when the received PDCP PDU is accompanied by indication 2, the PDCP receiving entity assumes that all the PDCP PDUs stored in the buffer including the received PDCP PDU are in sequence, and delivers them to a next processing block in step 970.

Figure 10:
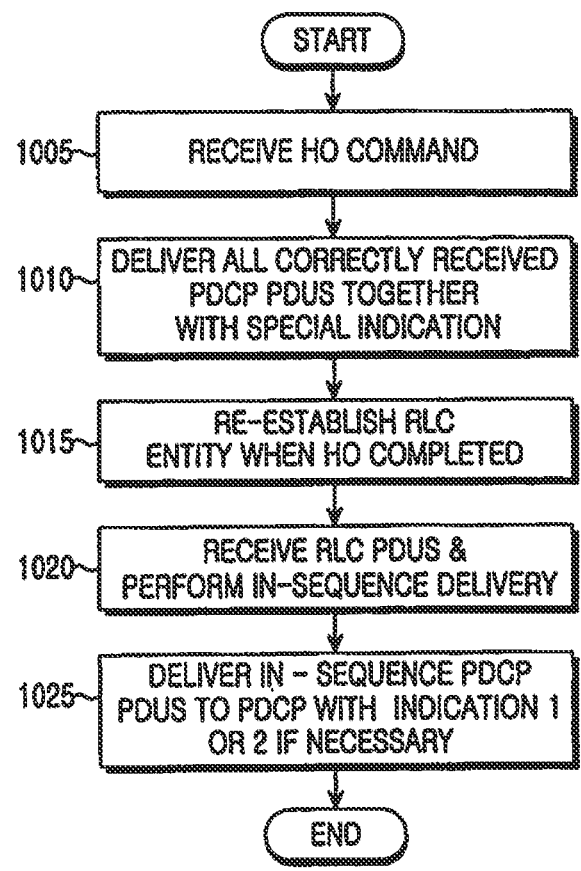
FIG. 10 illustrates a flow diagram illustrating a process of RLC reception by a UE according to the present invention.

In step 1005 of FIG. 10, the UE receives a handover command from the source ENB. In step 1010, the RLC receiving entity of the UE assembles the qualified RLC PDUs into PDCP PDUs and delivers the assembled PDCP PDUs together with a special indication requiring reordering of the PDCP PDUs to the PDCP receiving entity.

After performing the handover to the target cell, the UE transmits a handover complete message to the target ENB in step 1015. Then, the UE removes the existing RLC receiving entity and constructs a new RLC receiving entity for connection with the target cell. Then, in step 1020, the newly constructed RLC receiving entity performs an "in-sequence deliver" operation for the RLC PDUs received from the target cell. In step 1025, the newly constructed RLC receiving entity delivers the in-sequence PDCP PDUs to the PDCP receiving entity. At this time, the PDCP PDU constructed by assembling the RLC PDUs containing RLC control information 1 is delivered together with indication 1 to the PDCP receiving entity, and the PDCP PDU constructed by assembling the RLC PDUs containing RLC control information 2 is delivered together with indication 2 to the PDCP receiving entity.

Figure 11:
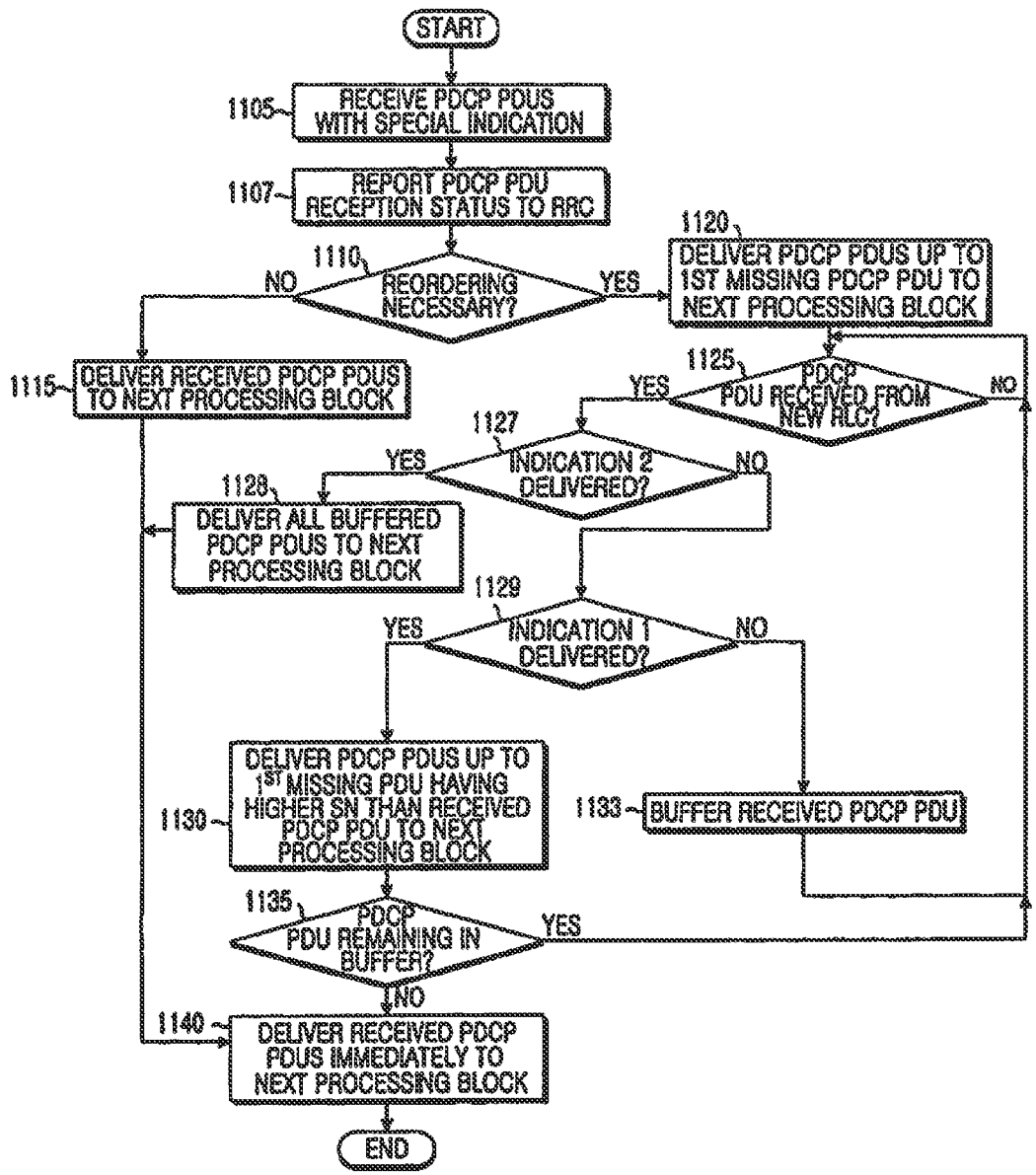
FIG. 11 is a flow diagram illustrating an operation of a PDCP receiving entity according to the present invention.

Referring to FIG. 11, when PDCP PDUs together with a special indication requiring reordering are delivered from the RLC receiving entity in step 1105, the PDCP receiving entity obtains sequence numbers of correctly received PDCP PDUs and missing PDCP PDUs by checking the sequence numbers of the delivered PDCP PDUs, and reports the obtained sequence numbers to the RRC entity of the UE for use in reporting the PDCP reception status of the UE in step 1107. The RRC entity inserts the PDCP reception status of the UE in the handover complete message transmitted to the target ENB.

In step 1110, the PDCP receiving entity checks if it is necessary to reorder the PDCP PDUs delivered from the RLC receiving entity. Based on the result, the PDCP receiving entity proceeds to step 1120 when the reordering is necessary, or proceeds to step 1115 when the reordering is unnecessary. When the reordering is necessary, it implies that there is at least one missing PDCP PDU.

In step 1115, the PDCP receiving entity delivers the received PDCP PDUs to a next processing block. Then, in step 1140, the PDCP receiving entity performs normal operations for the PDCP PDUs received thereafter. In other words, the PDCP receiving entity immediately delivers the PDCP PDUs to the next processing block as soon as receiving the PDCP PDUs from the RLC receiving entity.

In step 1120, the PDCP receiving entity delivers the reordered PDCP PDUs, that is, PDCP PDUs having sequence numbers lower than the sequence number of the first missing PDCP PDU, to the next processing block, and stores the remaining PDCP PDUs requiring the reordering in the reordering buffer. Then, in step 1125, the PDCP receiving entity waits until a PDCP PDU is delivered from the RLC receiving entity newly constructed for the target cell. When a PDCP PDU is delivered from the RLC receiving entity newly constructed for the target cell, the PDCP receiving entity proceeds to step 1127 in which the PDCP receiving entity determines if the PDCP PDU is accompanied by indication 2. The PDCP receiving entity proceeds to step 1128 when the PDCP PDU is accompanied by indication 2, and proceeds to step 1129 when the PDCP PDU is not accompanied by indication 2.

Since indication 2 indicates that there is no possibility that another PDCP PDU having a sequence number lower than that of the delivered PDCP PDU may be further received and there is no possibility that any of the PDCP PDUs currently stored in the reordering buffer may be reordered to become in-sequence, the PDCP receiving entity delivers all the PDCP PDUs stored in the reordering buffer to a next processing block and then proceeds to step 1140 in which the PDCP receiving entity performs normal operations.

When the PDCP PDU is not accompanied by indication 2, the PDCP receiving entity proceeds to step 1129 in which the PDCP receiving entity determines if the PDCP PDU is accompanied by indication 1. Since indication 1 indicates that there is no possibility that another PDCP PDU having a sequence number lower than that of the delivered PDCP PDU may be further received, the PDCP receiving entity proceeds to step 1130 in which the PDCP receiving entity assumes all PDCP PDUs, which have sequence numbers higher than a sequence number of the delivered PDCP PDU, up to the first missing PDCP PDU, as in-sequence PDCP PDUs, and outputs the assumed in-sequence PDCP PDUs to a next processing block.

Thereafter, in step 1135, the PDCP receiving entity checks if out-of-sequence PDCP PDUs remains in the reordering buffer. Then, when out-of-sequence PDCP PDUs remains in the reordering buffer, the PDCP receiving entity proceeds to step 1125 in which the PDCP receiving entity keeps on performing the reordering operation. When out-of-sequence PDCP PDUs do not remain in the reordering buffer, the PDCP receiving entity proceeds to step 1140 in which the PDCP receiving entity performs the normal operations.

Meanwhile, when the determination in step 1129 concludes that the PDCP PDU is not accompanied by indication 1, the PDCP receiving entity proceeds to step 1133 in which the PDCP receiving entity stores the PDCP PDU according to its sequence number in the reordering buffer. Then, the PDCP receiving entity proceeds to step 1125 in which the PDCP receiving entity performs the normal operations.

Figure 12:
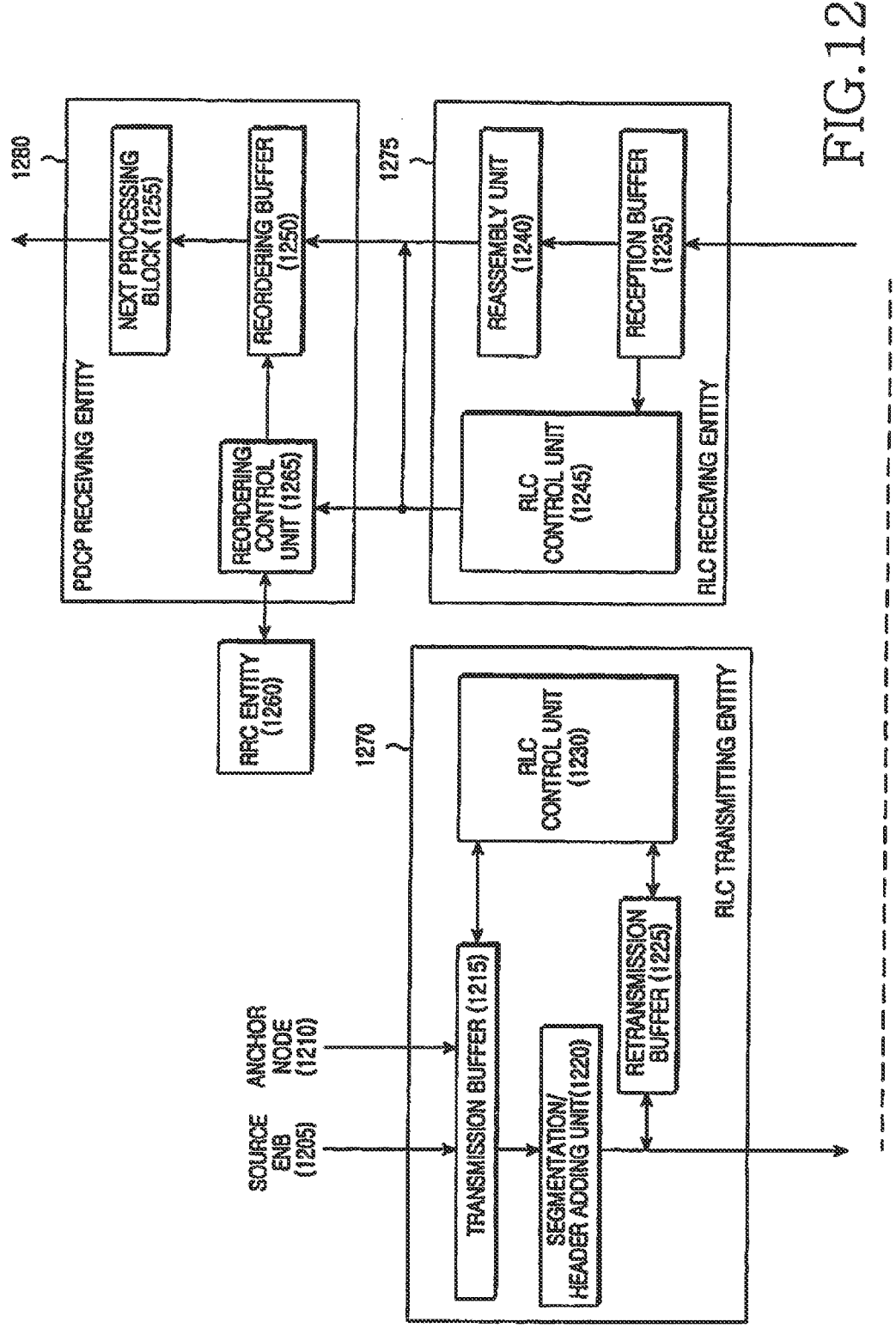
FIG. 12 is a block diagram illustrating structures of transmitting/receiving entities according to the present invention.

Referring to FIG. 12, an RLC transmitting entity 1270 of a target ENB includes a transmission buffer 1215, a segmentation/header adding unit 1220, a retransmission buffer 1225, and an RLC control unit 1230. The transmission buffer 1215 stores PDCP PDUs 1205 delivered from a source ENB and PDCP PDUs 1210 delivered from an anchor node. According to the first embodiment of the present invention, transmission buffer 1215 stores the delivered PDCP PDUs after ordering them according to their sequence numbers. According to the second embodiment of the present invention, transmission buffer 1215 stores the delivered PDCP PDUs according to the order in which the PDCP PDUs were delivered.

Transmission buffer 1215 delivers the PDCP PDUs appointed by RLC control unit 1230 from among the stored PDCP PDUs to segmentation/header adding unit 1220 and removes the delivered PDCP PDUs.

Segmentation/header adding unit 1220 segments or concatenates the PDCP PDUs delivered from transmission buffer 1215 into PDCP PDUs each having the proper size, and then inserts an RLC header including an RLC sequence number, etc. into the PDCP PDUs, thereby reconstructing at least one RLC PDU. At this time, if RLC control information has been transmitted from RLC control unit 1230, segmentation/header adding unit 1220 inserts the RLC control information into a predetermined location of the reconstructed RLC PDU. The RLC PDU is delivered to retransmission buffer 1225 and a lower layer. The RLC PDU delivered to the lower layer is delivered to an RLC receiving entity 1275 of the UE according to a predetermined sequence, and the RLC PDU delivered to retransmission buffer 1225 is stored until an ACK signal from RLC receiving entity 1275 arrives.

RLC control unit 1230 controls transmission and retransmission of RLC PDUs or PDCP PDUs stored in transmission buffer 1215 and retransmission buffer 1225. Specifically, RLC control unit 1230 receives sequence numbers of PDCP PDUs, which the UE correctly received from the source ENB, from an RRC entity (not shown), and removes the PDCP PDUs from transmission buffer 1215. Further, when there is RLC control information to be transmitted to the UE, RLC control unit 1230 delivers the RLC control information to segmentation/header adding unit 1220, so that the RLC control information can be piggybacked on the transmitted RLC PDU. According to the second embodiment of the present invention, when the PDCP PDU delivered from transmission buffer 1215 is the PDCP PDU delivered from the source ENB, RLC control unit 1230 controls segmentation/header adding unit 1220 so that RLC control information of 1 is attached to a corresponding RLC PDU. At the time of transmitting a last PDCP PDU delivered from the source ENB, RLC control unit 1230 controls segmentation/header adding unit 1220 so that RLC control information of 2 is attached to a corresponding RLC PDU.

RLC receiving entity 1275 includes a reception buffer 1235, an RLC control unit 1245, and a reassembly unit 1240. Reception buffer 1235 stores the RLC PDUs received from the ENB according to RLC sequence numbers. From among the in-sequence RLC PDUs, RLC PDUs fit to be assembled as PDCP PDUs are delivered from reception buffer 1235 to reassembly unit 1240. At this time, if the RLC PDU includes control information, the control information is delivered to RLC control unit 1245.

Reassembly unit 1240 assembles the RLC PDUs delivered from reception buffer 1235 into PDCP PDUs and then delivers the PDCP PDUs to a PDCP receiving entity 1280.

When the UE receives a handover command, RLC control unit 1245 controls reception buffer 1235 that reception buffer 1235 delivers all RLC PDUs fit to be assembled as PDCP PDUs from among the RLC PDUs stored in reception buffer 1235 to reassembly unit 1240. Further, RLC control unit 1245 delivers a special indication to a reordering control unit 1265 of PDCP receiving entity 1280 to request a reordering buffer 1250 to store the PDCP PDUs delivered at a corresponding time point (i.e. a time point at which the special indication is delivered) until they become in sequence. Meanwhile, when the handover of the UE is completed, an RRC entity 1260 collects PDCP PDU reception status information from reordering control unit 1265 and inserts the collected PDCP PDU reception status information into the handover complete message transmitted to the target ENB.

According to the second embodiment of the present invention, if RLC receiving entity 1275 has received RLC control information 1 together with the RLC PDU from the target ENB, RLC control unit 1245 delivers indication 2 to reordering control unit 1265 of PDCP receiving entity 1280 together with the PDCP PDU assembled from the RLC PDUs containing the RLC control information 2.

PDCP receiving entity 1280 includes a reordering buffer 1250, a reordering control unit 1265, and a next processing block 1255. Processing block 1255 may include, for example, a deciphering unit and a header decompression unit in order to process a higher layer protocol in relation to the service being provided to the UE.

Normally, reordering buffer 1250 directly delivers a PDCP PDU delivered from RLC receiving entity 1275 to next processing block 1255. However, when it receives a reordering command from reordering control unit 1265, reordering buffer 1250 stores the PDCP PDUs required to be reordered.

According to the first embodiment of the present invention, when reordering buffer 1250 receives a PDCP PDU from the newly constructed RLC receiving entity 1275 while the PDCP PDUs required to be reordered are stored in reordering buffer 1250, reordering buffer 1250 assumes PDCP PDUs up to the first missing PDCP PDU having a sequence number higher than that of the received PDCP PDU to be in sequence and delivers the PDCP PDUs to next processing block 1255. Further, when there is no stored PDCP PDU, reordering buffer 1250 performs normal operations again and directly delivers received PDCP PDUs to next processing block 1255.

According to the second embodiment of the present invention, when reordering buffer 1250 receives a PDCP PDU together with the indication 1, reordering buffer 1250 assumes PDCP PDUs up to the first missing PDCP PDU having a sequence number higher than that of the received PDCP PDU to be in sequence and directly delivers the PDCP PDUs to next processing block 1255. Further, when reordering buffer 1250 receives a PDCP PDU together with the indication 2, reordering buffer 1250 assumes all stored PDCP PDUs to be in sequence and delivers all the PDCP PDUs to next processing block 1255.

Next processing block 1255 reconstructs an IP packet by deciphering the PDCP PDUs delivered from reordering buffer 1250 and restoring the header, and then delivers the IP packet to a higher layer (e.g. IP layer).

Now, effects of the present invention, which has the construction and operation as described above, will be briefly described.

According to the present invention, in handover re-establishing an ARQ entity in a mobile communication system, a PDCP entity, which is a higher layer of the ARQ entity, performs a reordering operation, so that a target cell can selectively retransmit packets, which a UE has not received in a source cell, to the UE. Therefore, the present invention can improve efficiency of the communication.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A data communication method in a wireless communication system including a radio link control (RLC) entity and a packet data convergence protocol (PDCP) entity, the method comprising:
   receiving a message associated with a handover;
   assembling at least one PDCP packet from at least one RLC packet;
   delivering the assembled at least one PDCP packet from the RLC entity to the PDCP entity;
   storing the delivered at least one PDCP packet in a PDCP buffer;
   generating PDCP status information and transmitting the PDCP status information;
   re-establishing the RLC entity;
   receiving, by the PDCP entity from the RLC entity, a new PDCP packet having a sequence number (SN); and
   delivering, by the PDCP entity to a higher layer, the at least one PDCP packet with an associated SN lower than the SN associated with the received new PDCP packet and the at least one PDCP packet with a consecutively associated SN starting from the SN associated with the received new PDCP packet.

2. The method of claim 1, wherein the PDCP status information indicates a reception status of the at least one PDCP packet.

3. The method of claim 1, wherein the PDCP status information is transmitted to a target eNB.

4. The method of claim 1, wherein the re-established RLC entity is used in a target cell.

5. The method of claim 4, further comprising:
   checking at least one PDCP packet with the associated SN lower than the SN associated with the received new PDCP packet, and at least one PDCP packet with the consecutively associated SN starting from the SN associated with the received new PDCP packet.

6. The method of claim 1, wherein the at least one PDCP packet with the associated SN lower than the SN associated with the received new PDCP packet and the at least one PDCP packet with the consecutively associated SN starting from the SN associated with the received new PDCP packet are correctly received before the re-establishing the RLC entity.

7. The method of claim 1, wherein the PDCP status information comprises at least one SN associated with at least one missing PDCP packet.

8. The method of claim 1, wherein the PDCP status information comprises at least one SN associated with at least one correctly received PDCP packet.

9. A user equipment (UE) apparatus for receiving a message associated with a handover in a wireless communication system, the UE apparatus comprising:
   a radio link control (RLC) entity configured to assemble at least one PDCP packet from at least one RLC packet, deliver the assembled at least one PDCP packet to a packet data convergence protocol (PDCP) entity, and be re-established; and
   the PDCP entity configured to store the delivered at least one PDCP packet in a PDCP buffer, generate PDCP status information, transmit the PDCP status information, receive from the RLC entity a new PDCP packet having a sequence number (SN), and deliver to a higher layer the at least one PDCP packet with an associated SN lower than the SN associated with the received new PDCP packet and the at least one PDCP packet with a consecutively associated SN starting from the SN associated with the received new PDCP packet.

10. The UE apparatus of claim 9, wherein the PDCP status information indicates a reception status of the at least one PDCP packet.

11. The UE apparatus of claim 9, wherein the PDCP entity transmits the PDCP status information to a target eNB.

12. The UE apparatus of claim 9, wherein the re-established RLC entity is used in a target cell.

13. The UE apparatus of claim 12, wherein the PDCP entity is further configured to:
   check at least one PDCP packet with the associated SN lower than the SN associated with the received new PDCP packet, and at least one PDCP packet with the consecutively associated SN starting from the SN associated with the received new PDCP packet.

14. The UE apparatus of claim 9, wherein the at least one PDCP packet with the associated SN lower than the SN associated with the received new PDCP packet and the at least one PDCP packet with the consecutively associated SN starting from the SN associated with the received new PDCP packet are correctly received before the RLC entity is re-established.

15. The UE apparatus of claim 9, wherein the PDCP status information comprises at least one SN associated with at least one missing PDCP packet.

16. The UE apparatus of claim 9, wherein the PDCP status information comprises at least one SN associated with at least one correctly received PDCP packet.

* * * * *